United States Patent
Ramamurthy

(10) Patent No.: US 10,129,317 B2
(45) Date of Patent: *Nov. 13, 2018

(54) METHOD AND APPARATUS FOR STREAMING MEDIA CONTENT TO CLIENT DEVICES

(71) Applicant: GOOGLE TECHNOLOGY HOLDINGS LLC, Mountain View, CA (US)

(72) Inventor: Arjun Ramamurthy, San Diego, CA (US)

(73) Assignee: GOOGLE TECHNOLOGY HODLINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,767

(22) Filed: Nov. 20, 2017

(65) Prior Publication Data

US 2018/0124147 A1 May 3, 2018

Related U.S. Application Data

(63) Continuation of application No. 15/358,957, filed on Nov. 22, 2016, now Pat. No. 9,854,021, which is a (Continued)

(51) Int. Cl.
| | |
|---|---|
| H04L 29/06 | (2006.01) |
| H04N 21/2343 | (2011.01) |
| H04N 21/239 | (2011.01) |
| H04N 21/24 | (2011.01) |
| H04N 21/258 | (2011.01) |

(Continued)

(52) U.S. Cl.
CPC ............ *H04L 65/607* (2013.01); *H04L 65/60* (2013.01); *H04L 65/601* (2013.01); *H04L 65/80* (2013.01); *H04L 67/02* (2013.01); *H04N 21/2393* (2013.01); *H04N 21/23439* (2013.01); *H04N 21/2402* (2013.01); *H04N 21/2407* (2013.01); *H04N 21/25808* (2013.01); *H04N 21/4825* (2013.01); *H04N 21/6581* (2013.01)

(58) Field of Classification Search
USPC ................................. 709/231, 203, 224, 226
See application file for complete search history.

(56) References Cited

U.S. PATENT DOCUMENTS

2010/0169458 A1* 7/2010 Biderman .......... H04N 7/17318
709/219

* cited by examiner

*Primary Examiner* — El Hadji M Sall
(74) *Attorney, Agent, or Firm* — Young Basile Hanlon & MacFarlane, P.C.

(57) ABSTRACT

A method includes providing a variant playlist file that identifies a plurality of variant streams each corresponding to a different encoding of a same media presentation; tracking a first set of media segments encoded at a first bitrate that correspond to a first playlist file for a first variant stream associated with the variant playlist file; responsive to a second encoded bitrate associated with a second set of media segments that correspond to a second variant stream being higher than the first encoded bitrate: determining a number of media segments to include in a plurality of media segments from the second set of media segments that correspond to the first set of media segments; and providing, to the client device, a second playlist file that identifies a plurality of media segments from the second set of media segments that correspond to respective ones of the first set of media segments.

20 Claims, 8 Drawing Sheets

Related U.S. Application Data continuation of application No. 13/681,797, filed on Nov. 20, 2012, now Pat. No. 9,537,917.

(51) Int. Cl.
*H04N 21/658* (2011.01)
*H04L 29/08* (2006.01)
*H04N 21/482* (2011.01)

METHOD AND APPARATUS FOR STREAMING MEDIA CONTENT TO CLIENT DEVICES

CROSS REFERENCE TO RELATED APPLICATIONS

This application is a continuation of U.S. application Ser. No. 15/358,957 filed Nov. 22, 2016, which is a continuation of U.S. Pat. No. 9,537,917 issued Jan. 3, 2017, which is incorporated by reference in its entirety.

FIELD OF THE DISCLOSURE

The present disclosure relates generally to streaming media content to client devices and more particularly to reducing network congestion as client devices switch between variant streams.

BACKGROUND

Since 1992, when the first image was posted on the Internet, methods for delivering media across computer networks have been developed, which continue to evolve. Today, video is one of the dominant forms of downloaded media due to greater network bandwidths coupled with a wide variety of available multimedia-capable devices. For instance, YouTube reports that as of January 2012, 4 billion videos per day were viewed on its site alone—a number which continues to grow.

A prevalent standard used to support video downloads is Hypertext Transfer Protocol (HTTP) Live Streaming (HLS), which allows playback to begin on a client device before a video is received in its entirety. HLS, as described in Internet Engineering Task Force (IETF) Internet Draft HTTP Live Streaming publication (Pantos & May; ver. 10; Oct. 15, 2012-Apr. 18, 2013, and all subsequent versions (collectively referred herein to as HLS, the HLS draft specification, or the HLS standard)), is a client-driven protocol that divides a video presentation into discreet chunks, which can be downloaded separately and played in sequential order. While this approach makes effective use of network resources on average, spikes in bandwidth utilization occur when client devices switch between different variant streams while playing media presentations.

When transitioning from one variant stream to another with a different encoded bitrate under the HLS standard, a client device downloads multiple, at least one from each variant stream, media segments that correspond to the same portion of the media presentation being played. This enables the client device to synchronize the video and audio between variant streams for a seamless transition during playback. A disadvantage of this approach is that the simultaneous download of multiple media segments from different variant streams that correspond to the same portion of the media presentation results in elevated use of network bandwidth.

Further, if the client device is transitioning to a variant stream that has a higher encoded bitrate than the one it is transitioning from, the client device often requests additional media segments from the new variant stream that have the same media content as media segments it has already downloaded from the previous variant stream. This is done so that the client device can purge its buffer of lower-bitrate media segments, which expedites its transition to higher-bitrate playback. Downloading these additional media segments that have duplicate media content in close time proximity to one another, however, compounds the problem of increased demand placed on network resources.

Accordingly, there is a need for a novel method and apparatus for streaming media content to client devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
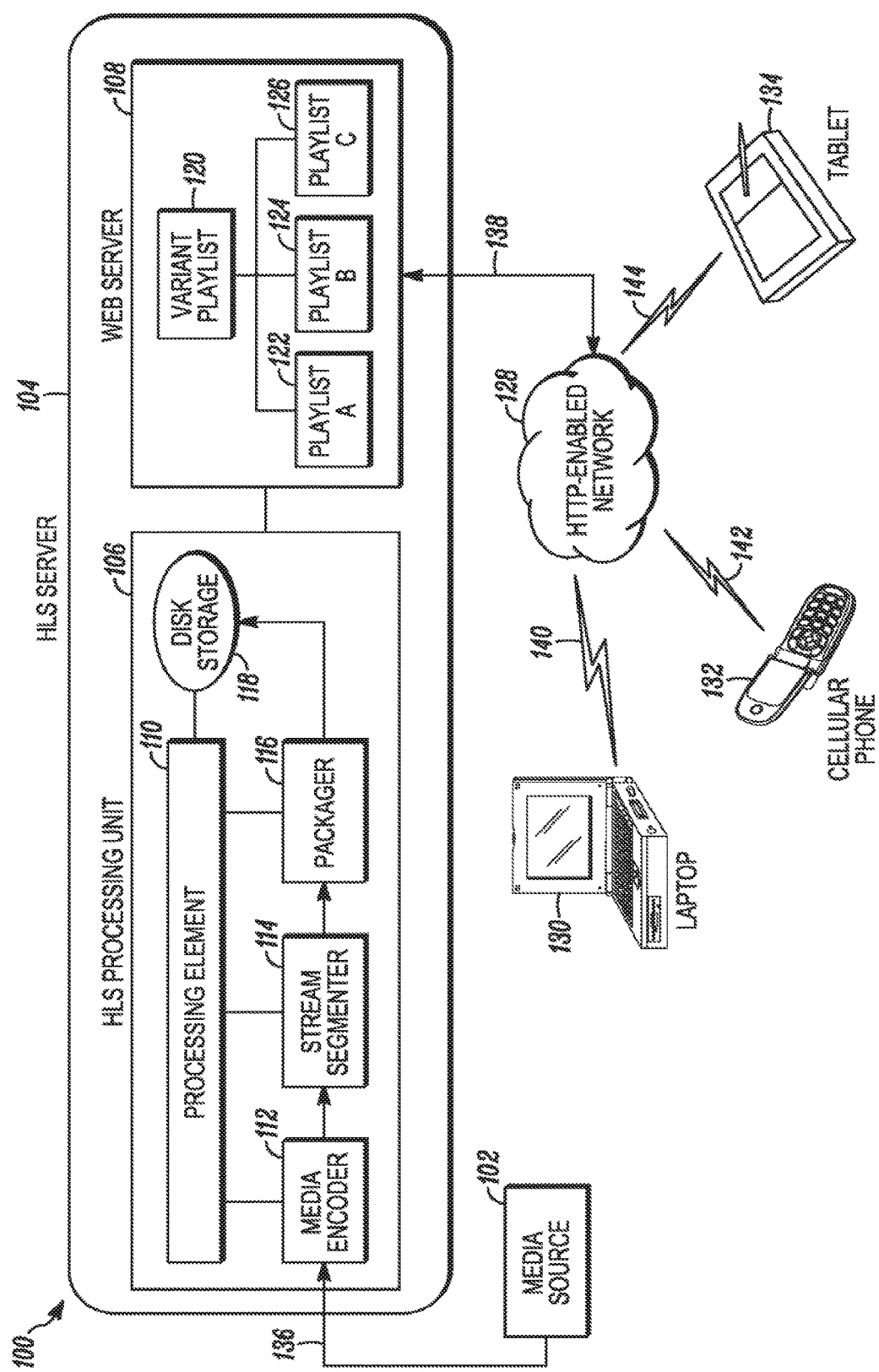
FIG. 1 is a block diagram of network infrastructure configured to stream multimedia content in accordance with some embodiments of the present teachings.

Skilled artisans will appreciate that elements in the figures are rendered for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for reducing network congestion as client devices switch between variant streams while downloading a media presentation. Limiting the download of media segments from different variant streams that correspond to the same portion of a media presentation results in a reduced load placed on the network while it is streaming the media presentation. By aligning media segments boundaries and instantaneous decoder refresh (IDR) frames across multiple variant streams, an intelligent server can override a client device's request for concurrent media segments while still allowing the device to switch seamlessly between different encoded bitrates.

In accordance with the teachings herein, a method, performed by a server, for providing to a client device media segments from multiple variant streams comprises providing, for the client device, a variant play list file that identifies a plurality of variant streams each corresponding to a different encoding of a same media presentation; and tracking sequence numbers of a first set of media segments downloaded by the client device, wherein media segments of the first set of media segments are encoded at a first encoded bitrate and are identified in a first play list file for a first variant stream identified in the variant play list file. The method also comprises receiving, from the client device, a request for a second play list file that identifies a second set of media segments from a second variant stream identified in the variant play list file, wherein media segments of the second set of media segments are encoded at a second encoded bitrate; and determining, based on the tracking, whether to identify, in the second play list file, at least one media segment in the second set of media segments that has a same sequence number as any of the media segments, from the first variant stream, downloaded by the client device. The method further comprises providing, to the client device, the second play list file that identifies the second set of media segments from the second variant stream In a particular embodiment, the server identifies a number of media segments in the second play list file that have a same sequence number as media segments, from the first variant stream, already downloaded by the client device. The number of media segments identified in the second playlist file having a same sequence number as media segments, from the first variant stream, downloaded by the client device is determined based on at least one of: an amount of network bandwidth available for the client device; or an amount of media content stored in a buffer of the client device.

Also in accordance with the teachings herein is an apparatus for switching a client device between encoded bitrates for a streamed media presentation that comprises an interface configured to receive requests from the client device and provide media segments to the client device, wherein each media segment comprises a group of pictures that begins with an instantaneous decoder refresh frame; and a processing unit configured to provide, to the client device, a variant play list file that identifies a plurality of variant streams each corresponding to a different encoding of a same media presentation; and track a set of sequence numbers of a first set media segments, downloaded by the client device, identified in a first play list file that corresponds to a first variant stream, from the plurality of variant streams, encoded at a first bitrate. The processing unit is also configured to receive, from the client device, a request for a second play list file that identifies a second set of media segments from a second variant stream, from the plurality of variant streams, encoded at a second bitrate; and receive, from the client device, a request for a second play list file that identifies a second set of media segments from a second variant stream, from the plurality of variant streams, encoded at a second bitrate. The processing unit is further configured to provide to the client device the second play list file that identifies the second set of media segments from the second variant stream.

Further in accordance with the teachings herein, is a non-transient computer-readable storage element having a computer readable code stored thereon for programming a computer to perform a method for switching client devices between media segments corresponding to different encoded bitrates. The method comprises providing, to a client device, a first play list file identifying a first set of media segments from a first variant stream corresponding to a media presentation encoded at a first encoded bitrate, and a second play list file identifying a second set of media segments from a second variant stream corresponding to the media presentation encoded at a second encoded bitrate, wherein each media segment comprises a group of pictures and is independently decodable without referencing another media segment, and wherein each media segment corresponds to a portion of the media presentation. The method also comprises tracking the portions of the media presentation for which the client device has downloaded a corresponding media segment from the first set of media segments; and receiving, from the client device, a request for the second play list file. The method further comprises determining whether to include in the second set of media segments identified in the second playlist file, one or more media segments corresponding to tracked portions of the media presentation for which the client device has downloaded a corresponding media segment from the first set of media segments identified in the first play list file.

Referring now to the drawings, and in particular FIG. 1, a system comprising network infrastructure implementing embodiments in accordance with the present teachings is indicated generally at 100. Shown at 100 is a media source 102, an HLS server 104 (that includes an HLS processing unit 106 and a web server 108), an HTTP-enabled network 128, links or connections 136-144, and three client devices, namely, a laptop 130, a cellular phone 132, and a tablet 134. The HLS processing unit 106, in turn, comprises a processing element 110, and disk storage 118. Additionally, the HLS processing unit 106 (also referred to herein simply as the "processing unit") is shown to comprise a media encoder 112, a stream segmenter 114, and a packager 116, which, in an embodiment, are logical indications of functionality performed by the HLS processing unit 106. Only a limited number of system elements 102-118, 128-134 are shown at 100 for ease of illustration, but additional such elements may be included in the system. Moreover, other elements needed for a commercial embodiment of the system 100 are omitted from the drawing for clarity in describing the enclosed embodiments.

We now turn to a brief description of the elements within the system 100. In general, the HLS server 104, which is configured to operate in compliance with the HLS draft specification, and a plurality of its constituent elements are adapted with functionality in accordance with embodiments of the present disclosure as described in detail below with respect to the remaining figures. The client devices 130-134, media source 102, and infrastructure elements within the network 128 are also configured to perform their, respective, functionality. "Adapted," "operative" or "configured" as used herein means that the indicated elements are implemented using one or more memory devices, interfaces, and/or processing devices that are operatively coupled. The memory devices, interfaces, and/or processing devices, when programmed, form the means for these system elements to implement their desired functionality.

The interfaces (not shown but used to establish and maintain the illustrated connections 136-144 between the system elements) are used for passing signaling, also referred to herein as messaging (e.g., messages, packets, datagrams, frames, superframes, and the like), containing control information, voice, or non-voice media between the elements of the system 100. The implementation of the interface in any particular element depends on the particular type of network, i.e., wired and/or wireless, to which the element is connected. For example, the client devices contain wireless interfaces (that are used to establish wireless connections) to attach to the HTTP-enabled network 128, and the HLS server 104 can contain wired interfaces (that are used to establish wired connections) to connect to infrastructure devices contained in the network 128. Examples of wired interfaces include Ethernet, T1, USB interfaces, etc. Examples of wireless interfaces include wireless protocols and associated hardware that support technologies including, but not limited to, Long Term Evolution (LTE), CDMA, GSM, Wi-Fi, etc.

Where the system 100 supports wireless communications, the interfaces comprise components including processing, modulating, and transceiver components that are operable in accordance with any one or more standard or proprietary wireless interfaces, wherein some of the functionality of the processing, modulating, and transceiver elements can be performed by means of one or more processing devices through programmed logic such as software applications or firmware stored on the memory device of the system element or through hardware. In a particular embodiment, the connections 136-144 maintained by the interfaces are internet protocol (IP) connections.

Processing devices (e.g., the HLS processing unit 106 and processing element 110) utilized by the elements of system 100 may be partially implemented in hardware and, thereby, programmed with software, firmware logic or code for performing their functionality as described, for example, by reference to FIGS. 2-7; and/or the processing devices may be completely implemented in hardware, for example, as a state machine or ASIC (application specific integrated circuit). The memory (e.g., disk storage 118) implemented by these system elements can include short-term and/or long-term storage of various information needed for the functioning of the respective elements. The memory may further store software or firmware for programming the processing device with the logic or code needed to perform its functionality.

Turning back again to the detailed description of the system 100 elements, the HLS server 104, interchangeably referred to herein as "the server," manages the methods described throughout these teachings for streaming media content to client devices and optimizing network performance. To accomplish this, the HLS server 104 comprises a processing element 110, interchangeably referred to herein as a "computer," which can be programmed, for example, via a non-transient computer-readable storage element having computer-readable code stored thereon.

Interfaced to the HLS server 104 is the media source 102, which streams media content over connection 136 to the media encoder 112 within the HLS processing unit 106. In alternate embodiments, the media encoder 112 can be located outside of the HLS server 104. The media source 102 streams media in a particular format, which is either compressed (e.g., lossy) or uncompressed (e.g., lossless). Streamed media is media that is continuously received at and presented by a client device while it is being delivered (i.e., streamed) by a streaming media source. If the media content is compressed, the media encoder 112 transcodes the media from one compressed format into another. Where the media content is uncompressed, the media encoder 112 encodes the media stream. In a particular embodiment, independent of the format of the media stream received from the media source 102, output streams from the media encoder 112 are encoded using MPEG-4 media compression (e.g., MPEG-4 part 10 Advanced Video Coding (AVC)/ H.264 video compression with Advanced Audio Coding (AAC) audio compression) and encapsulated using an MPEG-2 transport-stream container format. Such an embodiment, however, is not limiting, and other forms of encoding and/or encapsulation may be used to implement the teachings described herein.

In one embodiment, the media encoder 112 transcodes or encodes a plurality of variant streams from the media stream it receives, wherein each variant stream corresponds to a different encoded bitrate and/or resolution. The encoded bitrate, as used herein, refers to the information density of an encoded media stream or file, specifically, the number of bits per unit of playback time. Typically, higher encoded bitrates correspond to increased playback quality, and also to larger files that require more bandwidth and/or time to download. The encoded bitrate for a media stream can be reduced, for example, by encoding fewer frames per second, decreasing the frame size, reducing the number of colors, encoding for monaural rather than multichannel audio, or using more efficient compression (which can require greater client-side processing capability for decoding).

The term "encoding" as used herein refers to how the data within a media file or stream is formatted. Two variant streams presenting the same content have different encodings where they have different encoded bitrates. Two variant streams presenting the same content can also correspond to different encodings where their encoded bitrates are the same. This might be the case, for example, where one variant stream is formatted for higher-resolution frames presented at a lower rate while the other is formatted for lower-resolution frames presented at a higher rate, respectively.

For various embodiments, the HLS server, client devices 130-134, and media source 102 all control to varying degrees the encoded bitrates of the variant streams produced by the media encoder 112. In one embodiment, for example, when standard-definition media content is received from the media source 102, the media encoder 112 restricts encoded bitrates to 2 megabits per second (Mbps) and lower. When high-definition media content is received, the media encoder 112 can produce a variant stream with an encoded bitrate of 4 Mbps. In another embodiment, the processing element 110 will direct the media encoder 112 to produce variant streams with encoded bitrates that allow the HLS server 104 to perform its functionality as described herein. In further embodiments, the media encoder 112 within the HLS server 104 produces variant streams with particular encoded bitrates in response to requests received from the client devices 130-134 or in response to parameters entered by an administrator or programmer.

The stream segmenter 114 receives the plurality of variant MPEG-2 transport streams output by the media encoder 112 and subdivides or partitions each variant MPEG-2 transport stream into a sequence of media segment files of smaller duration (typically between 1 to 10 seconds, although durations that fall outside of this range are also possible). Media segment files, sometimes referred to in the art as "chunks," are also referred to herein as "media segments." The term "duration," as used herein, is defined as the playback time of a media segment file or stream portion played by a client device at normal speed (i.e., the intended playback speed of the presentation being streamed). The media segment files are then passed from the stream segmenter 114 to the packager 116, which prepares them for a specific delivery protocol. In a particular embodiment, for example, the delivery protocol supports HTTP GET requests under the HTTP pull model.

The system 100 stores the media segment files from the packager 116 within the disk storage 118 for the web server 108 to access and distribute. Disk storage 118 is a storage device comprising flash memory, solid state devices, or one or more rotating platters having a surface layer on which data is digitally recorded (e.g., an array of independent magnetic hard drives). As shown in FIG. 1, disk storage 118 is located within the HLS processing unit 106 of the HLS server 104. Alternate embodiments, however, allow for the storage of media segment files outside of the HLS processing unit 106. Possible locations include within the web server 108, internal to the HLS server 104 but external to the web server 108, or external to the HLS server 104. Additionally, substitute devices can be used for the storage of media segment files, such as optical drives and other compatible technologies.

The web server 108 delivers (i.e., serves up) the media segment files stored at 118 to the client devices 130-134. The functionality of the web server 108 can be implemented as hardware (i.e., a physical server), software (i.e., a computer program), or a combination of the two. Further, a physical web server can be located either within (as shown) or external to the HLS server 104. As indicated at 120, the web server 108 publishes (i.e., hosts) a variant playlist file (also referred to herein as a variant play list) by making it accessible to one or more client devices. In an embodiment, the processing unit 106 of the HLS server 104 is configured to provide the variant play list file to the client device having a format in conformance with HLS and to provide media segments to the client device using HTTP.

The variant play list file 120 serves as a directory that contains entries pointing to individual play lists 122-126 (also referred to herein as play list files) which, in turn, contain entries that point to individual media segment files from the variant streams. A "pointer," as used herein, is a means by which the web server 108 is directed to a resource being pointed to. An example of a pointer is a uniform resource locater (URL). The web server 108 can map the pathcomponent of the URL into a local file system resource for static requests, or a program name for dynamic requests. The first portion of the URL comprises a domain name which is mapped to the IP address of the web server 108 by a domain name server. The remainder of the URL (the path component) comprises a path relative to the root directory of the web server 108 which is translated by a user agent for the client device into an HTTP GET request.

The system 100 associates each individual play list published by the web server 108 with a variant stream having a specific encoded bitrate. Play list A 122, for example, might contain URLs that point to media segment files from a variant stream encoded in high-definition television (HDTV) format (i.e., 1280×720 pixels) at 60 frames per second, whereas the URLs in play list B 124 might point to media segment files from a variant stream encoded in Super Video Graphics Array (SVGA) format (i.e., 800×00 pixels) at 30 frames per second. Play list and variant play list files can also contain information tags, which in some embodiments comprise comment lines within the files that convey information about the variant streams and media segment files being described. In other embodiments, metadata is embedded within the media segment files using a data container such as ID3 (as described by informal standard documents: *id3v2.4.0-structure.txt* and *id3v2.4.0-frames.txt* (M. Nilsson; Nov. 1, 2000, and all subsequent versions)), for example. Metadata containers allow information about a file to be stored in the file itself.

In addition to live streaming, the teachings presented herein can also be applied to video on demand (VOD). For VOD, a full set of media segment files exists for a media presentation (i.e., video) at the time a client device makes a request (i.e., demand) for the presentation. This full set of media segments represents a complete encoding of the entire presentation, which can be identified in a play list used to stream the individual segments files to the client device. For live streaming, by contrast, the HLS server 104 receives the client device's request for a media presentation while it is still in the process of receiving the presentation and creating media segment files for it. At any given time during the live streaming process, media segment files are only available for a portion of the media presentation that has already been streamed to the HLS server 104. Playlist files for presentations being streamed live contain only entries pointing to available media segments. In a particular embodiment, consistent with the HLS draft specification, a play list file for a live stream contains entries for a fixed number of media segments (e.g., 3 media segments). As an entry for each new media segment created by the HLS server 104 is added to the play list, an entry for an older media segment is removed. In this way, the play list file represents a "sliding window" that "frames" a fixed number of "current" media segment files in real time as the play list tracks the live media presentation being streamed.

The HTTP-enabled network shown at 128 communicatively couples the client devices 130-134 to the HLS server 104. It represents a computer network that uses an HTTP protocol stack to govern the exchange of information. In a particular embodiment, the HTTP-enabled network 128 uses HTTP, Transmission Control Protocol (TCP), and IP protocols for its application, transport, and internet layers, respectively (e.g., the Internet). The HLS server 104 sends and receives data and messages to and from the client devices 130-134 using connection 138 which relays network packets (i.e., datagrams). The connection shown at 136 allows the HLS server 104 to receive streaming media from and relay control signals to the media source 102.

The laptop 130, cellular phone 132, and tablet 134 are all client devices that support the playback of audio- and/or video-based media files. Client devices are electronic devices with storage capability that can interact with the HLS server 104 to download and buffer media content. In addition to these particular devices, the teachings herein also apply to portable media players (PMPs), game consoles, and other electronic devices that can download and play media files. In an embodiment, each type of client device has a different set of capabilities that defines its playback characteristics, such as, but not limited to, screen size, buffer capacity, processing (e.g., decoding) ability, and minimum number of segments stored in its buffer to start playback.

Figure 2:
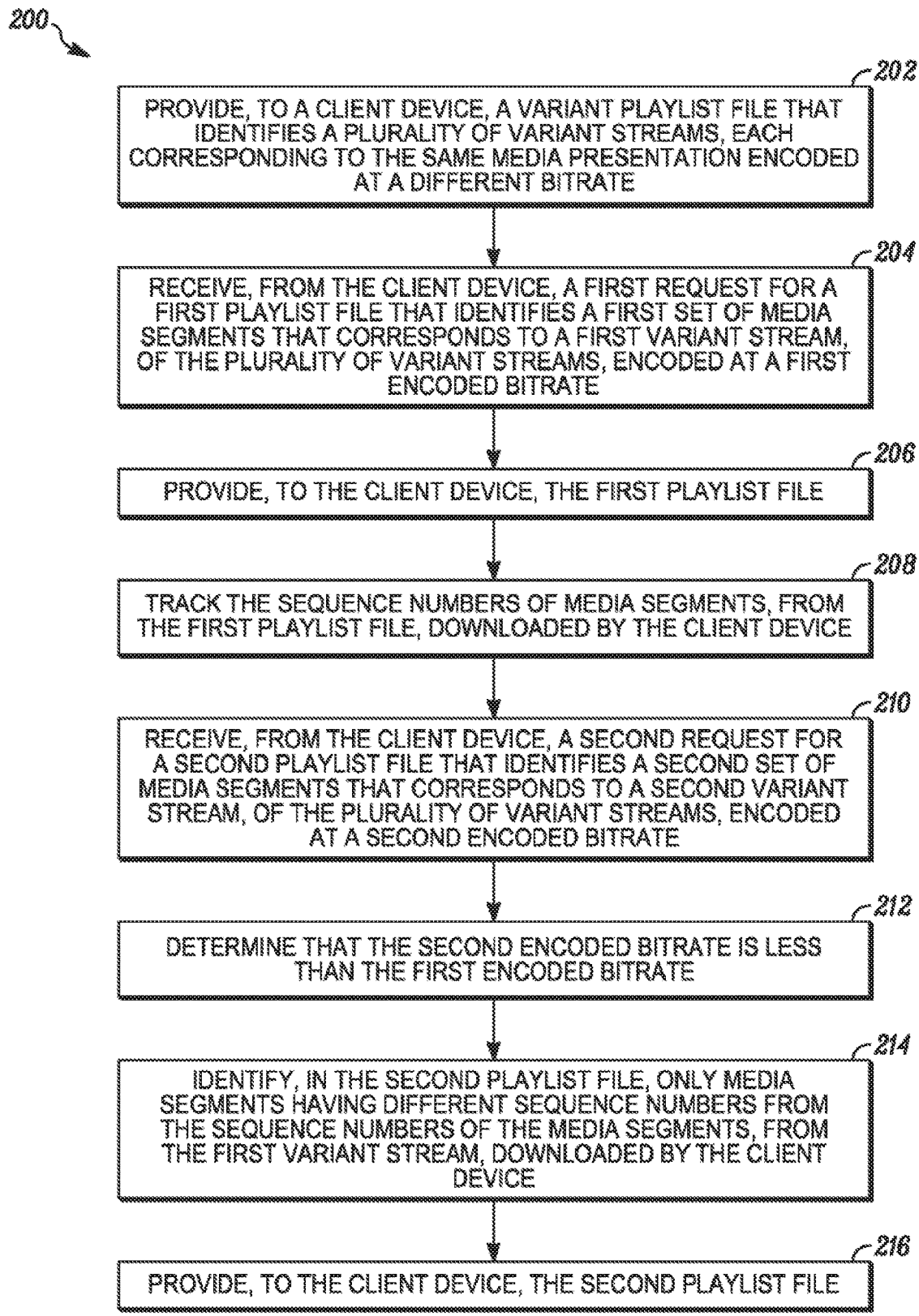
FIG. 2 is a logical flowchart illustrating a method for streaming multimedia content in accordance with some embodiments of the present teachings.

We turn now to a detailed description of the functionality of the system 100 elements in accordance with the teachings herein and by reference to the remaining figures. FIG. 2 is a logical flowchart illustrating how the individual elements of system 100 operate together to perform a method for streaming media content to one or more of the client devices shown at 130-134. In particular, FIG. 2 shows how the HLS server 104 performs a method 200 for reducing the load placed on the network 128 as the client devices switch between encoded bitrates while downloading streamed media presentations. At 202, the HLS server 104 provides a variant play list (e.g., the variant play list 120) file for a client device (e.g., the laptop 130) that identifies a plurality of variant streams. In a particular embodiment, the HLS server 104 providing the variant playlist 120 to the client device comprises the web server 108 publishing the variant play list 120. The variant play list 120 can be published specifically for a particular client device, a group of client devices, or made accessible to all client devices capable of connecting with and receiving streamed content from the HLS server 104.

Each variant stream of the plurality of variant streams identified by the variant play list 120 corresponds to a different encoding of the same media presentation. Therefore, each variant stream has the same content and duration, namely the content and duration of the presentation. A presentation can have an open-ended (i.e., undetermined) duration, for example, where it represents a live feed associated with a television or radio station, or it can be of a known finite duration, such as in the case where the presentation represents an archived film or video clip (i.e., VOD).

In an embodiment, the variant play list 120 identifies individual play lists, such as those shown in FIG. 1 at 122-126. For each variant stream identified in the variant play list 120, a pointer is listed that directs a client device to a corresponding play list which, in turn, comprises identifiers for media segments belonging to that variant stream. In an embodiment, the identifiers are uniform resource identifiers (URis), which comprise a URL and a uniform resource name (URN). The URL functions as a pointer, as indicated above, that specifies the location of a media segment or other file type being identified by the URN.

From the variant streams identified in the variant play list 120, a client-side selection is made for downloading a preferred encoding. This selection can be based upon user input specifying a preference, the desire for a particular screen resolution, for example, or result from programming within the client device. For purposes of this example, the client device selects a first variant stream corresponding to a first encoded bitrate. It then uses the HTTP-enabled network 128 to communicate its selection to the HLS server 104 as an HTTP GET request.

At 204, the HLS server 104 receives the request as a first request from the client device for a first play list file. The first play list file provides a first set of identifiers that directs the first client device to a first set of media segments from a first variant stream of the plurality of variant streams in the variant playlist file 120, wherein the first set of media segments corresponds to a first encoded bitrate. The term "set" is defined herein as having one or more elements. For the embodiment depicted in FIG. 1, the request is received by the web server 108 located within the HLS server 104. Thereafter, information associated with the request is communicated internally to the processing element 110 and any other elements needed to process the request in accordance with the teachings herein.

Figure 7:
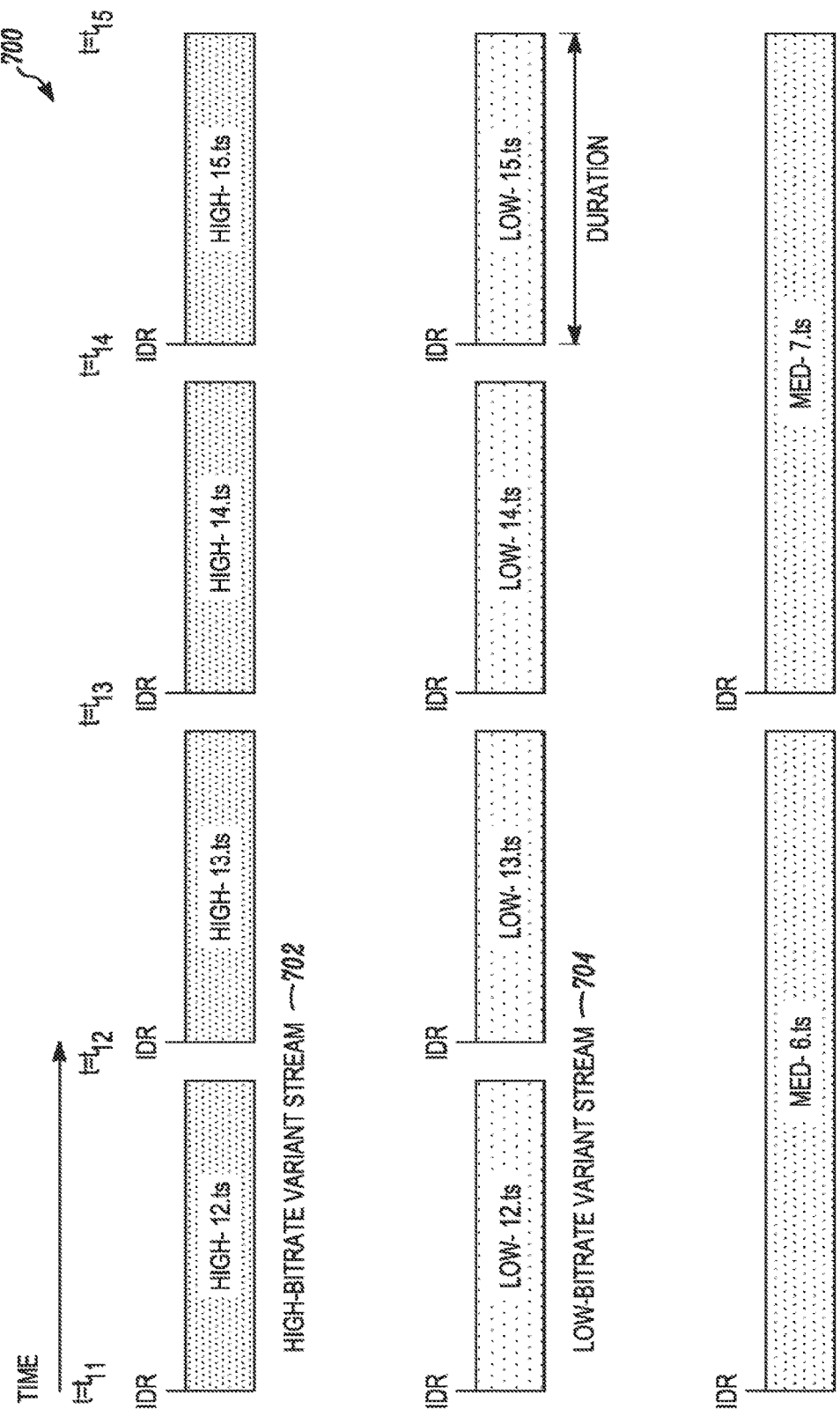
FIG. 7 is a schematic diagram of media segment files in accordance with some embodiments of the present teachings.

Turning momentarily to FIG. 7 to describe in more detail media segments identified by play list files, schematic diagrams of media segments representing three encoded bitrates are shown and indicated generally at 700. Media segments, which in one embodiment comprise a container, encoded video and audio content, and possibly an encryption protocol, represent portions of a streamed media presentation that are downloaded separately and then played in the correct sequential order. A client device downloads a media segment by copying or transferring it from where it is held remotely (i.e. away from the client device) to where it is held locally by storage or memory possessed by the client device. The video information within a media segment is encoded as a series of frames, with each frame representing a snapshot in time. There are two basic frame types: independent frames, which can be decoded without referencing any other frame, and dependent frames, which are decoded by referencing previous and/or successive frames. A sequence of frames that comprises an independent frame and all the frames that depend from it is defined as a group of pictures (GOP). Each GOP is self-contained in that it contains all the information to completely decode it and is, thereby, independently decodable (i.e., capable of being decoded) without referencing another GOP.

More particularly, FIG. 7 shows the same portion of a media presentation for three variant streams: a high-bitrate stream, a low-bitrate stream, and a medium-bitrate stream at 702, 704 and 706, respectively. The density of the pixilation displayed within each media segment is proportional to its encoded bitrate, which is highest for the media segments of variant stream 702 and lowest for the media segments of variant stream 704. The duration of each media segment shown is proportional to its length. In an embodiment, each variant stream is comprised of individual MPEG-2 transport stream (.ts) files that are identified by filenames that indicate the variant stream and include sequence numbers that define the relative order of the media segments within that variant stream. The variant stream 702, for example, starts with media segment "high-Us" (not shown) at time index $t=t_0$, and for each successive media segment, the sequence number is incremented by one. The four media segments shown, with sequence numbers 12-15, span the portion of the media presentation that plays from time index $t=t_u$ to time index $t=t15$. Playback of the media segments, which are generally buffered at a client device, is back-to-hack and occurs without interruption. The spaces between the segments shown in FIG. 7 are included only to illustrate that each media segment comprises a group of pictures that begins with an IDR frame.

The position of IDR frames at the beginning of each media segment is indicated by the "IDR" label. An IDR frame is a specific type of independent frame that specifies no frame after it can reference any frame before it. IDR frames are tagged so that upon receiving one, a client device can purge its decode buffer of any frames associated with a previous GOP. By the HLS server 104 placing IDR frames at the beginning of each media segment and aligning them across variant streams in accordance with the present teachings, as shown, a client device can switch between variant streams while playing a streamed media presentation without having to download duplicate media segments, one or more from each variant stream, that correspond to the same portion of the presentation.

A client device receiving the high-bitrate variant stream 702, for example, may need to switch over to the low-bitrate stream 704 due to network congestion. The client device can make the switch at time index $t=t12$, $t=t_n$, or $t=t14$ without downloading any low-bitrate media segments that corresponds to a portion of the media presentation already buffered by the client device. By contrast, where the media segments and IDR frames between two variant streams are not aligned, but rather overlap, downloading at least one media segment with duplicate content for a portion of the media presentation becomes necessary to synchronize playback of the two streams and bring the client device to the next IDR frame in the new stream. Shifting the low-bitrate media segments in the previous example forward in time by half their duration, for instance, would result in the client device downloading and playing media segment "high- 14.ts" before it advanced far enough in the media presentation to decode media segment "low-14.ts" and begin playing the low-bitrate variant stream 704.

The media segments of the medium-bitrate variant stream 706 are shown to have twice the duration of the media segments from the other two variant streams at 702 and 704. When there is a relatively large (as compared to an average) delay associated with passing messages between a client device and the HLS server 104, there is an advantage to encoding media segments with a longer duration. For a client device which is "more removed" from the HLS server 104, it takes datagrams a longer period of time to reach their destination because they are relayed over more "waypoints." The HLS server 104 determines this transmission delay for the client device by measuring the time interval between it sending out a datagram and it receiving an acknowledgment in return.

Dividing a portion of a media presentation into media segments of a shorter duration results in a greater number of files. This requires a greater number of requests to be passed to the HLS server 104 by the first client device to obtain those files. Because the transmission delay associated with multiple files is cumulative, any benefit of faster bitrate transitions associated with providing short-duration media segments to the client device might be abrogated by the need to send more requests. For this reason, some embodiments include media segments of longer duration. In the particular embodiment shown at 700, the media segments and IDR frames of the medium-bitrate variant stream at 706 are still aligned with those of variant streams 702 and 704 at time index t=t13. This allows the client device to switch to and from the medium-bitrate variant stream 706 at this, and other, points of alignment without downloading overlapping media segments.

Returning now to FIG. 2, the HLS server 104 provides the client device with the first play list file at 206 in response to the first request. As the client device downloads media segments from the first variant stream identified in the first play list file to begin (or continue) playback of the media presentation, the HLS server 104 tracks the sequence numbers of the downloaded media segments, at 208. Sequence numbers, as used herein, are sequential numbers assigned to the media segments in a variant stream that define their relative order of playback. Because the media segments are pieces of a single contiguous file representing a media presentation, media segments with lower sequence numbers correspond to earlier portions of the presentation and are played before media segments with higher sequence numbers that correspond to later portions of the presentation. As used herein, tracking is the process by which the HLS server 104 logs or records the media segments that have been downloaded by a client device. For one embodiment, the HLS server 104 retains a record of all media segments from a variant stream downloaded by the client device. In another embodiment, the HLS server 104 retains only a subset of the most-recently tracked media segments from the variant stream. For example, the HLS server 104 retains only the sequence numbers of the tracked media segments that currently reside in the buffer of the client device.

For some embodiments, the HLS server 104 is a stateful server that can track media segments. A stateful server is a server that retains client data (i.e., state data) received from communicative interactions with client devices. In one embodiment the HLS server 104 interrogates connected client devices 130-134 for their hardware and/or software configuration. In another embodiment, the HLS server 104 passively receives configuration information embedded in requests sent by the client devices 130-134. This client data is cumulatively stored from one request to the next and used by the HLS server 104 in processing those requests. For a particular embodiment, the HLS server 104 determines the duration of buffered media retained by the client device (i.e., its stored playback time), which corresponds to a difference between a total duration of media segments received by the client device and an elapsed time over which the media segments were received. Dividing the stored playback time by the duration of the downloaded media segments (where each media segment has the same duration) allows the HLS server 104 to determine a number, n, of media segments currently in the buffer of the client device, which correspond to the last n sequence numbers tracked by the server 104.

At 210, the HLS server 104 receives, from the client device, a second request for a second play list file that identifies a second set of media segments from a second variant stream encoded at a second encoded bitrate. In one illustrative implementation, the second encoded bitrate is lower than the first encoded bitrate. A request for a lower encoded bitrate may result, for example, from a client device detecting a decrease in available network bandwidth, or from a user wishing to reduce the amount of resources used by a client device for streaming a particular media presentation.

After determining (212) the client device has requested a lower encoded bitrate, the HLS server 104 identifies (214) in the second play list file only media segments that correspond to one or more portions of the media presentation other than the tracked portions for which the client device has downloaded a corresponding media segment from the first set of media segments. For a particular embodiment, the second play list file is dynamically created for the client device in response to the request for the second play list file. This insures that the HLS server 104 does not identify media segments in the second playlist file that correspond to portions of the media presentation already downloaded by the client device. The term "dynamically," as used herein, indicates that an action (e.g., the creation of the second playlist) occurs in response to an event (e.g., the request for the second play list). This allows the action to be based on conditions that exist at the time of the event (e.g., not including media segments in the second play list that correspond to portions of the media presentation already downloaded).

For an embodiment, when the second encoded bitrate is lower than the first encoded bitrate, the second play list file identifies only media segments having different sequence numbers from the sequence numbers of the media segments, from the first variant stream, downloaded by the client device. In a further embodiment, the second play list file identifies only media segments having sequence numbers that exceed a highest sequence number of the media segments, from the first variant stream, downloaded by the client device. For example, in an embodiment for which the media presentation is a VOD presentation and the first play list file indentifies all media segments for the media presentation, the second play list file indentifies only media segments for a remaining portion of the media presentation with sequence numbers higher than a sequence number of a last media segment, from the first variant stream, downloaded by the client device.

The second set of media segments is identified using at least one of a set of uniform resource locators or a set of information tags corresponding to the second set of media segments. In an embodiment, for example, where the media presentation is a VOD presentation, the second play list files contains URLs that point to the individual media segments identified within the play list file. In another embodiment, where the media presentation is being streamed live, the HLS server 104 places information tags only with no URLs in the second playlist file for media segments that are not yet created.

At 216, the HLS server 104 provides the client device with the second play list file, enabling the client device to switch to the second variant stream and continue playing the media presentation. In a first embodiment where the second request for the second playlist file is received (210) by the HLS server 104 while the client device is downloading a media segment from the first play list file, the server 104 waits until the client device finishes downloading the media segment before publishing the second play list file. In a second embodiment, the HLS server 104 identifies in the second play list file a media segment with the same sequence number as the media segment from the first play list file that is being downloaded by the client device. This is the lowest sequence number appearing in the second play list file. When the client device receives the second play list file, it aborts the download of the media segment from the first play list file and begins downloading the media segment from the second play list file with the same sequence number.

Figure 3:
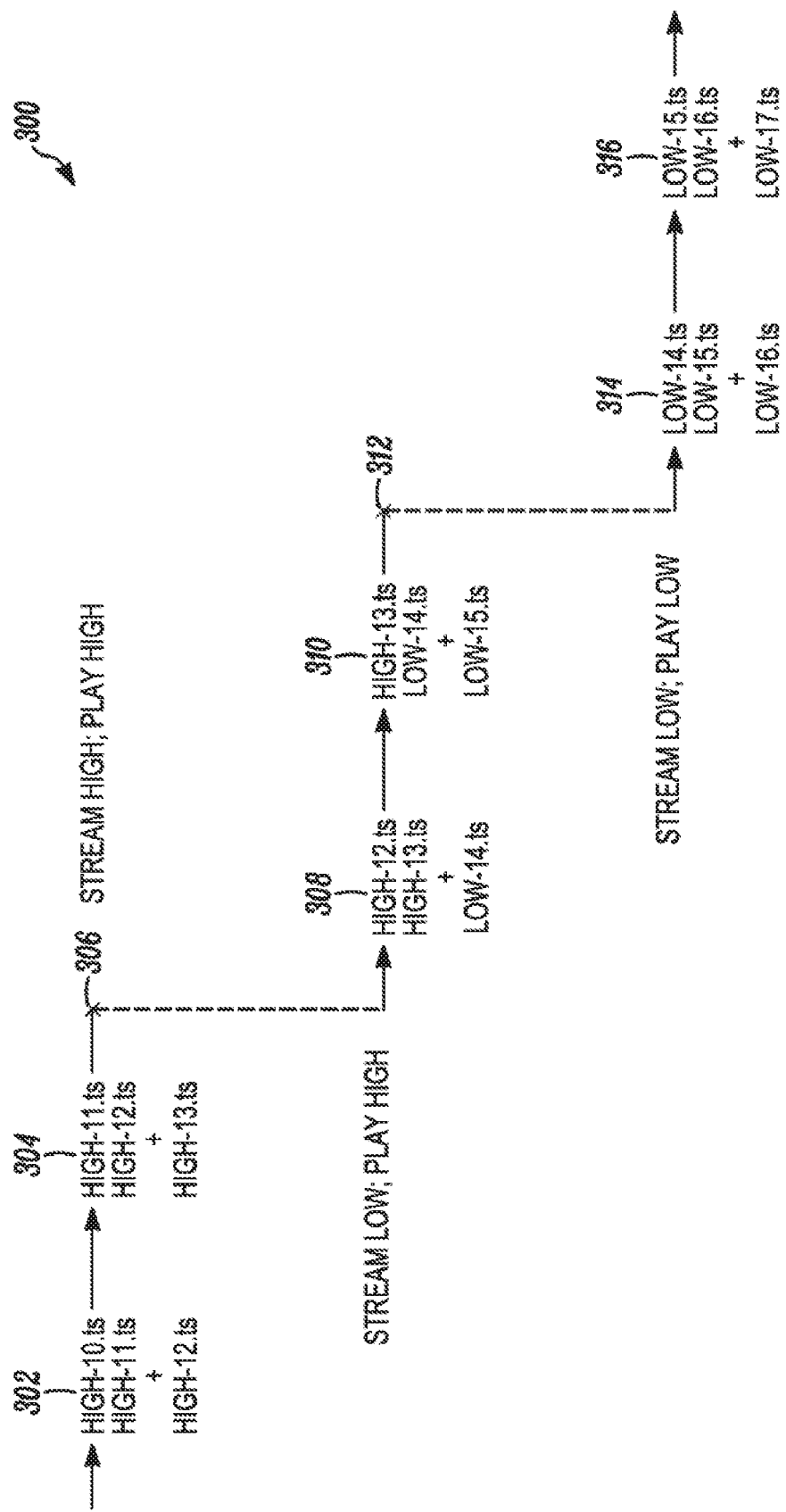
FIG. 3 is a schematic diagram of a client device switching between variant media streams in accordance with some embodiments of the present teachings.

FIG. 3 shows a schematic diagram at 300 that illustrates the client device switching between variant streams while playing a media presentation in accordance with some embodiments of the present teachings. The schematic diagram 300 represents a client device (not shown) playing a portion of a media presentation as it switches from a first variant stream, encoded at a "high" bitrate, to a second variant stream, encoded at a "low" bitrate. The arrows indicate the order of playback for the media segments high-1O.ts, high-11.ts, high-12.ts, high-13.ts, low-14.ts and low-15.ts being played at 302, 304, 308, 310, 314 and 316, respectively. The media segments appearing below the segments being played represent the buffered content of the client device at that time with the media segments appearing below the "+" symbol being actively streamed to the client device (i.e., in the process of being added to its buffer). While two media segments are shown to be buffered by the client device for illustrative purposes, the actual number of buffered media segments for FIG. 2, and also for FIGS. 5 and 6, can vary. For a particular embodiment, the number of buffered media segments depends on a number of parameters, which include the duration of the media segments, the buffer capacity of the client device, and the bandwidth of the network connection to the client device.

Three levels of activity are shown at 300. The uppermost level represents the client device playing high-bitrate media segments from the first variant stream while receiving media segments from that same stream. At the mid level, the client device is receiving low-bitrate media segments from the second variantstream as it plays high-bitrate media segments from its buffer. At the lowest level, the client device is receiving and playing low-bitrate media segments from the second variant stream. The "X" symbol, appearing at 306 and 312, represents points of transition between the indentified levels.

At 302, the client device plays high-10.ts as it downloads and adds high-12.ts to its buffer. In this detailed explanation of FIG. 3, and likewise for FIGS. 5 and 6, the words "media segment" are dropped when referring to a particular media segment by name. This is done in the interest of brevity. Media segment high-10.ts, for example, is simply referred to as "high-10.ts" herein. At 304, after finishing playback of media segment high-10.ts, the client device proceeds to play the next media segment in the sequence, high-11.ts, which was already buffered at 302. As the client device is playing high-11.ts at 304, high-13.ts is being streamed to its buffer. In a particular embodiment, each media segment is delivered to the client device using HTTP.

The transition point 306 represents the moment in time when the client device begins its transition to the second variant stream in response to a decline in available network bandwidth. It corresponds to the time the client device requests the second play list file at 210 in FIG. 2. At 308 and 310, the client device continues to play high-12.ts and high-13.ts, which were the last two media segments stored in its buffer prior to the transition point 306. While playing the remaining high-bitrate media segments, the client device is downloading and adding to its buffer the low-bitrate media segments low-14.ts and low-15.ts identified in the second playlist file provided by the HLS server 104 at 216 in FIG. 2. When the first encoded bitrate of the first variant stream exceeds the second encoded bitrate of the second variant stream, the processing unit 106 within the HLS server 104 is configured to identify in the second play list file only media segments from the second variant stream that have sequence numbers which exceed the highest sequence number in the tracked set of sequence numbers. In this case, low-14.ts, the first media segment identified in the second playlist file, has a sequence number of 14, which exceeds, by one, the sequence number of the last high-bitrate media segment the client device downloaded.

At transition point 312, the client device has exhausted its buffer of all high-bitrate media segments corresponding to the first variant stream, and it proceeds to play low-bitrate media segments from the second variant stream. At 314 and 316, the client device plays low-14.ts and low-15.ts, which were downloaded at 308 and 310, respectively. At 314 and 316, the client device also downloads and adds low-16.ts and low-17.ts, respectively, to its buffer for later playback. In one embodiment, the client device continues to download and play media segments from the second variant stream for the remainder of the media presentation. In another embodiment, the client device again transitions to another variant stream while playing the media presentation. For a particular embodiment, the client device transitions from the low-bitrate variant stream back to the high-bitrate variant stream after sufficient network bandwidth is restored. In another embodiment, the client device transitions from the low-bitrate variant stream to a medium-bitrate variant stream after sufficient network bandwidth is restored.

Figure 4A:
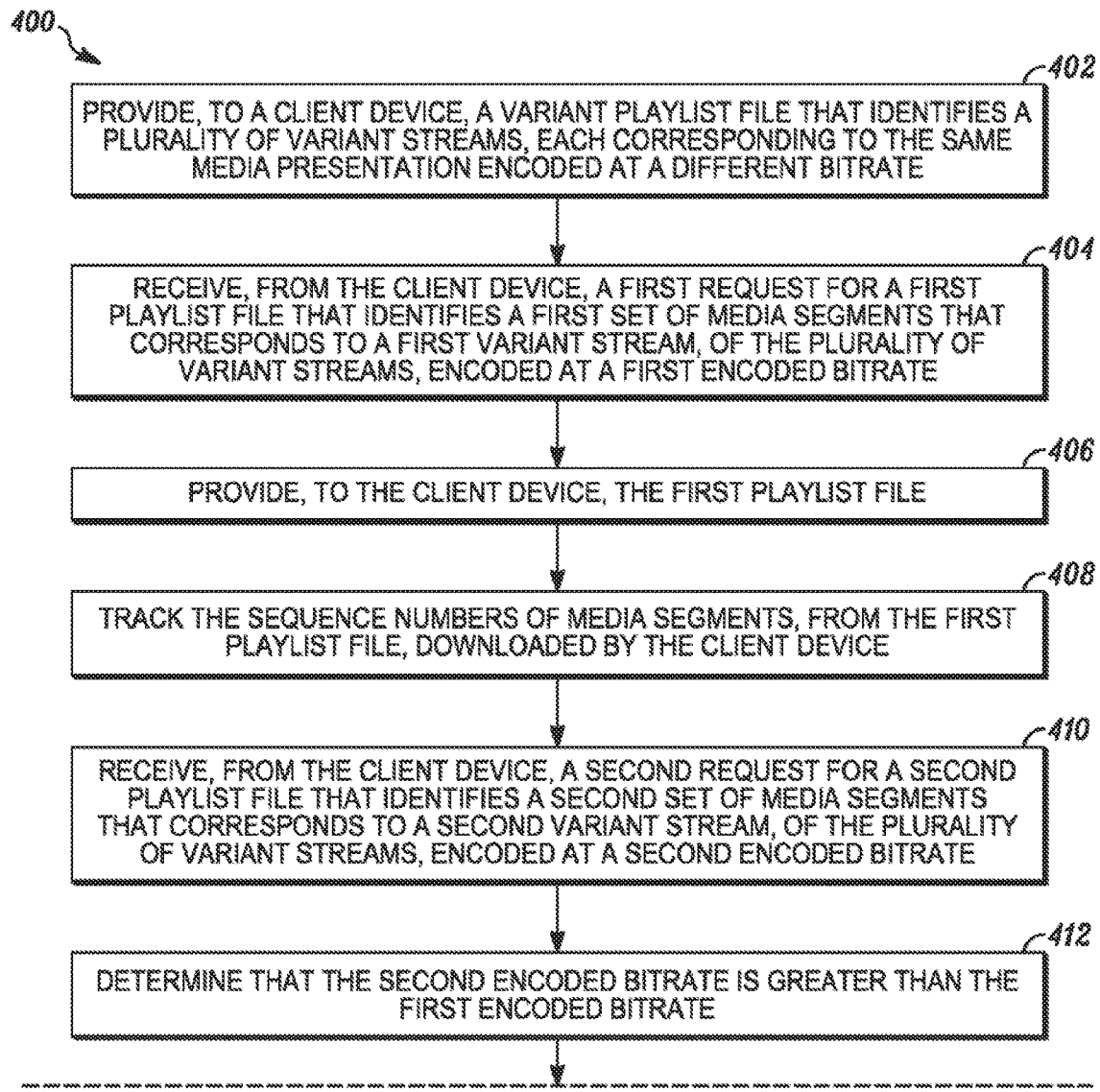
FIGS. 4A and 4B illustrate a logical flowchart illustrating a method for streaming multimedia content in accordance with some embodiments of the present teachings.
Figure 4B:
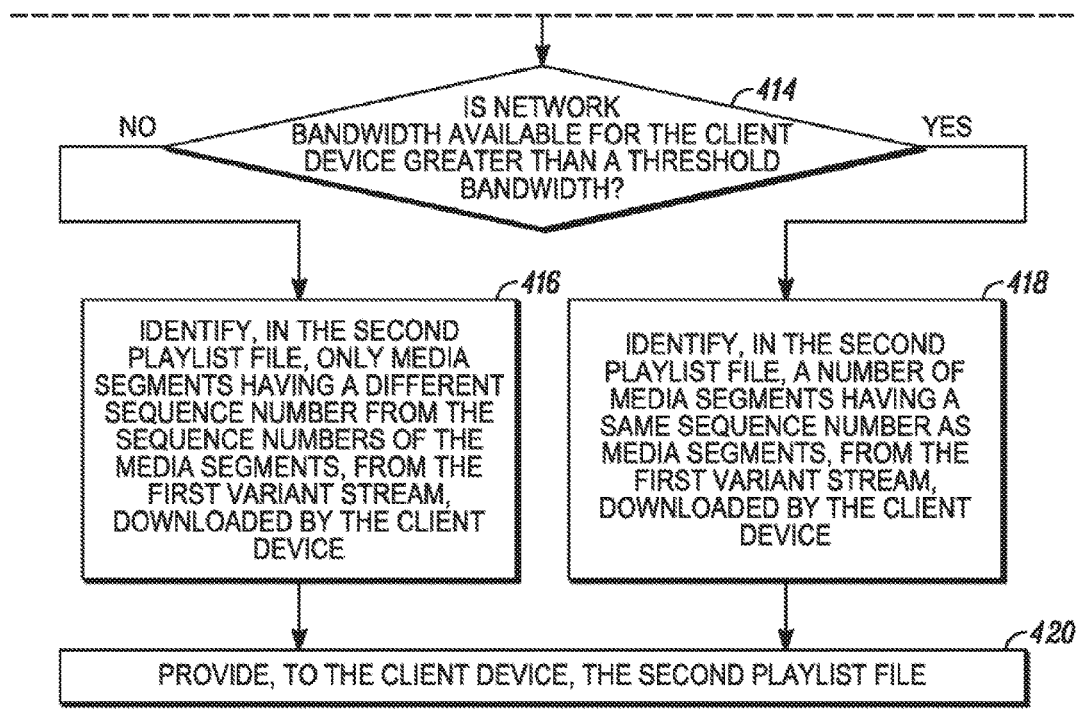

FIGS. 4A and 4B illustrate another logical flowchart illustrating how the individual elements of system 100 operate together to perform a method for streaming media content to one or more of the client devices shown at 130-134. In particular, FIGS. 4A and 4B show how the HLS server 104 performs a method 400 for transitioning a client device playing a media presentation to a variant stream with a higher encoded bitrate. At 402-408, the HLS server 104 performs the same actions as described for FIG. 2 at 202-208, respectively. Namely, providing (402) the client device with a variant play list identifying variant streams with different encoded bitrates, receiving (404) from the client device a first request for a first play list file identifying a first set of media segments from a first variant stream encoded at a first bitrate, providing (406) the first play list to the client device, and tracking (408) the sequence numbers of media segments from the first variant stream downloaded by the client device.

At 410, the HLS server 104 receives, from the client device, a second request for a second play list file that identifies a second set of media segments from a second variant stream encoded at a second encoded bitrate that is higher than the first encoded bitrate. A request for a higher encoded bitrate may result, for example, from a client device detecting an improvement in network conditions, or from a user looking to improve the quality of playback for a particular media presentation.

After determining (412) the client device has requested a higher encoded bitrate, the HLS server 104 checks at 414 if the available network bandwidth that can be allocated to the client device is greater than a threshold bandwidth. The threshold bandwidth can be a static value or a dynamic value that is determined by a program and depends upon the particular bitrate of the media segments identified in the second playlist file requested by the client device at 410. In an embodiment, a system administrator sets a static threshold bandwidth. In another embodiment, the processing element 110 determines a dynamic threshold bandwidth as a function of the second requested bitrate based on specific parameters that may also be set by a system administrator. For example, the threshold bandwidth can have a linear dependence on the second requested bitrate with a slope and baseline (i.e., y-intercept) specified as parameters.

If the available network bandwidth determined at 414 is not greater than the threshold bandwidth, the HLS server 104 identifies (at 416) in the second playlist file only media segments that correspond to one or more portions of the media presentation other than the tracked portions for which the client device has downloaded a corresponding media segment from the first set of media segments. In the alternative, if the available network bandwidth is greater than the threshold bandwidth, the HLS server 104 identifies (at 418) in the second playlist file a number of media segments that correspond to one or more tracked portions of the media presentation for which the client device has downloaded a corresponding media segment from the first set of media segments. In one embodiment, the number of media segments identified (418) in the second playlist file that correspond to one or more tracked portions of the media presentation is less than a number of media segments requested by the client device that correspond to one or more tracked portions of the media presentation.

For some embodiments, the HLS server 104 uses the sequence numbers tracked at 408 for the media segments downloaded from the first variant stream to determine media segments from the second variant stream that have the same content. In particular embodiments, for example, the media segments from the first and second variant streams have the same duration and are aligned with one another as shown in FIG. 7 for the low- and high-bitrate variant streams at 704 and 702, respectively. Media segments from the two variant streams having the same sequence number correspond to the same portion of the media presentation and, therefore, have the same media content.

For these embodiments, when the available network bandwidth is less than the threshold bandwidth and the second encoded bitrate is higher than the first encoded bitrate, the second play list file identifies (416) only media segments having different sequence numbers from the sequence numbers of the media segments, from the first variant stream, downloaded by the client device. If the available network bandwidth is greater than the threshold bandwidth, the second play list file identifies (418) a number of media segments having a same sequence number as media segments, from the first variant stream, downloaded by the client device. In a particular embodiment, the number of media segments identified (418) in the second play list file having the same sequence number as media segments, from the first variant stream, downloaded by the client device is less than a requested number of media segments having the same sequence number as media segments, from the first variant stream, downloaded by the client device.

Once the HLS server 104 identifies media segments in the second play list file, the play list is published at 420. Thereafter, the client device downloads the media segments identified in the second play list file to continue the process of switching the playback of a media presentation to a higher encoded bitrate.

Figure 5:
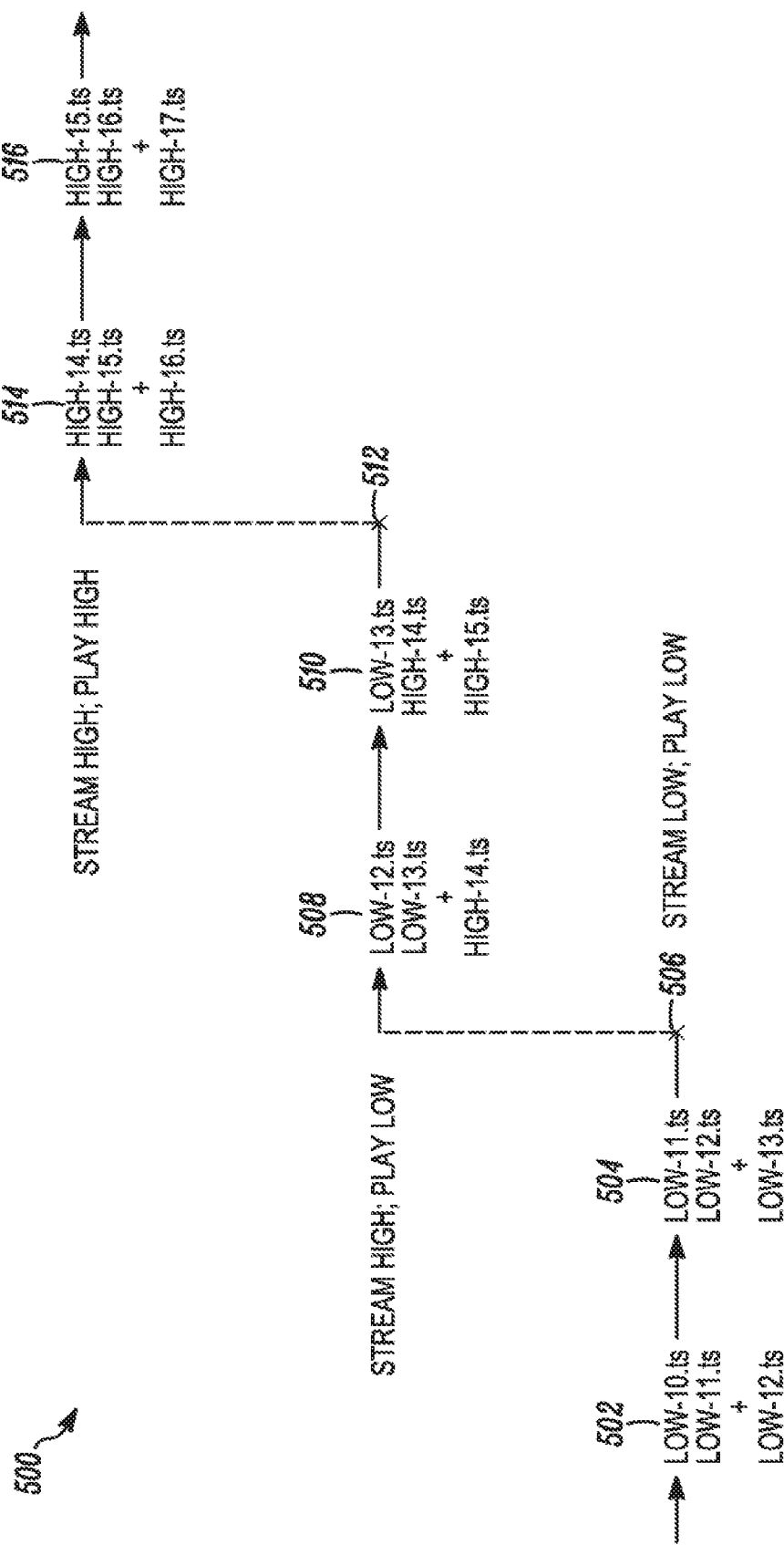
FIG. 5 is a schematic diagram of a client device switching between variant media streams in accordance with some embodiments of the present teachings.
Figure 6:
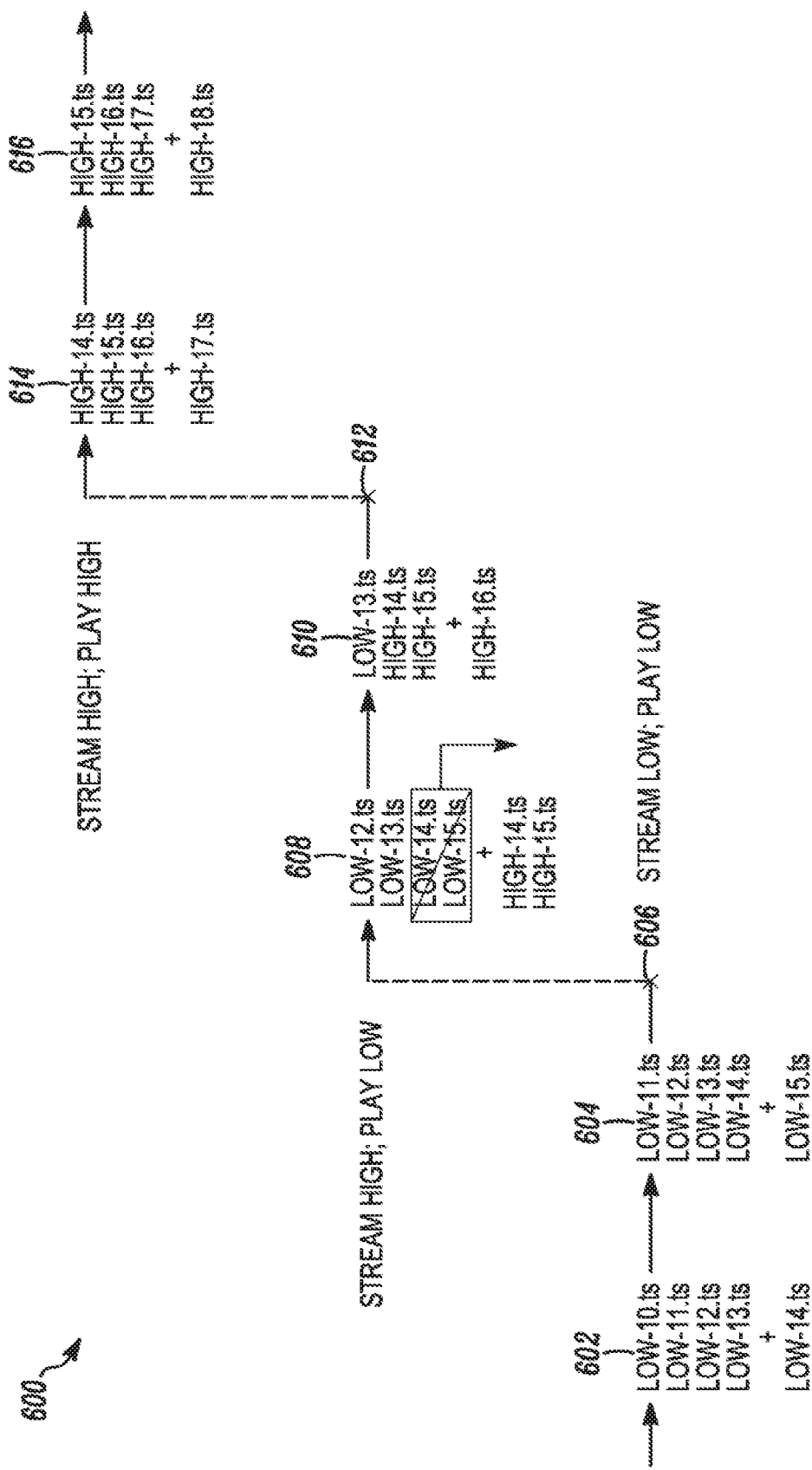
FIG. 6 is a schematic diagram of a client device switching between variant media streams in accordance with some embodiments of the present teachings.

FIGS. 5 and 6 are schematic diagrams 500 and 600, respectively, of the client device switching from a low-bitrate variant stream to a high-bitrate variant stream in accordance with some embodiments of the present teachings. FIG. 5, in particular, shows an embodiment where the second set of media segments identified in the second playlist file does not correspond to any portion of the media presentation already downloaded by the client device. This is the case when the available network bandwidth falls below the threshold bandwidth at 414 in FIG. 4B.

At 502, the client device is playing a media presentation from a first variant stream encoded at a low bitrate. It plays low-1O.ts as it downloads low-12.ts and adds it to its buffer, which already contains low-11.ts. When the client device finishes playing low-1O.ts. it begins to play low-11.ts, at 504, while it downloads and adds low-13.ts to its buffer. At transition point 506, the client device begins the transition to the high-bitrate variant stream The point 506 corresponds to the client device requesting the second playlist file at 410 in FIG. 4A. At 508, the client device has transitioned to downloading media segments from the high-bitrate variant stream while still playing the low-bitrate media segments that remain in its buffer. The client device plays low-12.ts and low-13.ts at 508 and 510, respectively, while downloading high-14.ts and high-15.ts.

The next transition point is reached at 512. Here, the client device has exhausted its buffer of media segments downloaded from the low-bitrate variant stream, and it begins to play media segments downloaded from the high-bitrate variant stream At 514, the client device plays high-14.ts, which was downloaded and buffered at 508, as it downloads and buffers high-16.ts. At 514 and 516, the client device has fully transitioned to high-bitrate playback.

The schematic diagram shown in FIG. 6 is consistent with the embodiment where, when the second encoded bitrate of the second variant stream exceeds the first encoded bitrate of the first variant stream, the processing unit 106 is configured to identify in the second play list file a number of media segments from the second variant stream that have the same sequence number as a sequence number in the tracked set of sequence numbers. This embodiment serves as a compromise between providing a user of the client device with a more enjoyable playback experience while also promoting more efficient use of network recourses (e.g., bandwidth).

At 602, the client device plays low-10.ts while downloading and adding low-14.ts to its buffer. Similarly, at 604, the client device plays low-11.ts while downloading and adding low-15.ts to its buffer. The client device requests the second play list file and begins the transition to the high-bitrate variant stream at 606. At 608, while playing low-12.ts from its buffer, the client device replaces the media segments low-14.ts and low-15.ts stored in its buffer with the media segments high-14.ts and high-15.ts, which are identified in the second playlist file. Here, the number of media segments (i.e., two), from the second variant stream, that have the same sequence number as a sequence number in the tracked set of sequence numbers is less than a requested number (e.g., three) of media segments from the second variant stream that have the same sequence number as a sequence number in the tracked set of sequence numbers.

At 608, four media segments are shown in the buffer of the client device: low-12.ts, low-13.ts, low-14.ts and low-15.ts. Low-12.ts is being played while playback of the other three has not yet begun. The HLS server 104, aware that the client device has requested improved playback quality in the form of a higher encoded bitrate, can proceed in a number of ways. In a first embodiment, if there is ample network bandwidth available, the HLS server 104 allows the client device to replace all the low-bitrate media segments in its buffer with high-bitrate media segments. The HLS server 104 does this by identifying in the second play list file media segments from the second variant stream that have the same sequence number as a sequence number in the tracked set of sequence numbers (i.e., sequence numbers of the low-bitrate media segments in the client device's buffer). By allowing the client device to purge and replace all the low-bitrate media segments from its buffer, the HLS server 104 provides it with the highest-quality playback experience.

In a second, and antithetical, embodiment, available network bandwidth is at a premium, and the HLS server 104 favors more efficient use of network resources. Here the HLS server 104 allows the client device to replace only one of the low-bitrate media segments in its buffer, namely low-15.ts, by identifying its high-bitrate equivalent, the media segment high-15.ts, in the second play list file. This allows the client device to transition to higher-quality (i.e., higher bitrate) playback somewhat faster than for the embodiment corresponding to FIG. 5 where no buffered media segments are replaced.

A third embodiment provides a compromise between the previous two, where not all, but more than one, of the low-bitrate media segments in the buffer of the client device are replaced with high-bitrate media segments containing the same media content. This is the embodiment illustrated at 600. At 608, low-14.ts and low-15.ts are removed from the buffer of the client device, as indicated by the downward-facing arrow, and replaced by adding high-14.ts and high-15.ts to the buffer from the second variant stream.

In particular variations on the third embodiment, the processing unit 106 is configured to determine the number of replacement media segments, from the second variant stream, that have the same sequence number as a sequence number in the tracked set of sequence numbers based on at least one of: an amount of network bandwidth available for the client device; or an amount of media content stored in a buffer of the client device. In one variation, the number of media segments swapped out from the buffer of the client device is a monotonically increasing function of the available network bandwidth, which is evaluated by the processing element 110 within the HLS server 104. In another variation, the number of media segments swapped out is determined by the processing element 110 as a percentage of the buffer capacity. Three media segments are swapped out at 50 percent of buffer capacity, for example, if the capacity of the buffer is 60 seconds and the duration of each buffered media segment is 10 seconds.

At 610, the client device plays the last low-bitrate media segment from the buffer that was not replaced, low-13.ts, before transitioning at 612 to the playback of high-bitrate media segments. At 614 and 616, the transition is complete, and the client device continues to both download and play high-bitrate media segments from the second variant stream until either the media presentation ends or the client device again switches variant streams.

By implementing embodiments disclosed by these teachings, significant benefits can be realized over current state-of-the-art media-streaming networks. By decreasing or eliminating the number of media segments downloaded by a client device from different variant streams that correspond to the same portion of a media presentation, demands placed on network resources are reduced. This can be accomplished by aligning the IDR frames within media segments across different variant streams to allow for seamless transitions between those streams without the need for downloading duplicate segments to synchronize playback at the transition points.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method, comprising:
   identifying a first switching identifier associated with a first content stream transmitted to a client device; and
   transmitting a second content stream to the client device, the second content stream starting with a data packet including a second switching identifier corresponding to the first switching identifier,
   wherein the first switching identifier is placed at a predetermined time interval in the first content stream and the second switching identifier is placed at a predetermined time interval in the second content stream.

2. The method of claim 1, wherein identifying the first switching identifier associated with the first content stream transmitted to the client device comprises:
   determining, during transmission of the first content stream to the client device, to switch from the first content stream to the second content stream; and
   responsive to the determining, searching data packets of the first content stream for the first switching identifier.

3. The method of claim 2, wherein determining to switch from the first content stream to the second content stream comprises:

receiving an indication of available bandwidth for transmitting the first content stream to the client device.

4. The method of claim 1, wherein the first content stream is transmitted via a first multicast channel and the second content stream is transmitted via a second multicast channel, the method further comprising:
   transmitting a message to the client device to cause the client device to switch from the first multicast channel to the second multicast channel to receive the second content stream.

5. The method of claim 4, wherein the message includes a multicast address associated with the second multicast channel.

6. The method of claim 4, wherein transmitting the second content stream to the client device comprises:
   transmitting the second content stream to the client device using the second multicast channel.

7. The method of claim 1, wherein a bit rate at which the first content stream is encoded is different from a bit rate at which the second content stream is encoded.

8. The method of claim 1, wherein the first content stream and the second content stream represent identical content.

9. An apparatus, comprising:
   a processor configured to execute instructions stored in a non-transitory storage medium to:
   identify a first switching identifier associated with a first content stream transmitted to a client device; and
   transmit a second content stream to the client device, the second content stream starting with a data packet including a second switching identifier corresponding to the first switching identifier,
   wherein the first switching identifier is placed at a predetermined time interval in the first content stream and the second switching identifier is placed at a predetermined time interval in the second content stream.

10. The apparatus of claim 9, wherein the instructions to identify the first switching identifier associated with the first content stream transmitted to the client device include instructions to:
    determine, during transmission of the first content stream to the client device, to switch from the first content stream to the second content stream; and
    responsive to the determination, search data packets of the first content stream for the first switching identifier.

11. The apparatus of claim 10, wherein the instructions to determine to switch from the first content stream to the second content stream include instructions to:
    receive an indication of available bandwidth for transmitting the first content stream to the client device.

12. The apparatus of claim 9, wherein the first content stream is transmitted via a first multicast channel and the second content stream is transmitted via a second multicast channel, wherein the instructions include instructions to:
    transmit a message to the client device to cause the client device to switch from the first multicast channel to the second multicast channel to receive the second content stream.

13. The apparatus of claim 12, wherein the message includes a multicast address associated with the second multicast channel, wherein the instructions to transmit the second content stream to the client device include instructions to:
    transmit the second content stream to the client device using the second multicast channel.

14. The apparatus of claim 9, wherein a bit rate at which the first content stream is encoded is different from a bit rate at which the second content stream is encoded, wherein the first content stream and the second content stream represent identical content.

15. A non-transitory computer-readable storage medium including executable instructions that, when executed by one or more processors, cause the one or more processors to perform operations, the operations comprising:
- identifying a first switching identifier associated with a first content stream transmitted to a client device; and
- transmitting a second content stream to the client device, the second content stream starting with a data packet including a second switching identifier corresponding to the first switching identifier,
- wherein the first switching identifier is placed at a predetermined time interval in the first content stream and the second switching identifier is placed at a predetermined time interval in the second content stream.

16. The non-transitory computer-readable storage medium of claim 15, wherein the operations for identifying the first switching identifier associated with the first content stream transmitted to the client device comprise:
- determining, during transmission of the first content stream to the client device, to switch from the first content stream to the second content stream; and
- responsive to the determining, searching data packets of the first content stream for the first switching identifier.

17. The non-transitory computer-readable storage medium of claim 16, wherein the operations for determining to switch from the first content stream to the second content stream comprise:
- receiving an indication of available bandwidth for transmitting the first content stream to the client device.

18. The non-transitory computer-readable storage medium of claim 15, wherein the first content stream is transmitted via a first multicast channel and the second content stream is transmitted via a second multicast channel, the operations further comprising:
- transmitting a message to the client device to cause the client device to switch from the first multicast channel to the second multicast channel to receive the second content stream.

19. The non-transitory computer-readable storage medium of claim 18, wherein the message includes a multicast address associated with the second multicast channel, wherein the operations for transmitting the second content stream to the client device comprise:
- transmitting the second content stream to the client device using the second multicast channel.

20. The non-transitory computer-readable storage medium of claim 15, wherein a bit rate at which the first content stream is encoded is different from a bit rate at which the second content stream is encoded, wherein the first content stream and the second content stream represent identical content.

* * * * *